United States Patent [19]
Klein et al.

[11] Patent Number: 5,493,068
[45] Date of Patent: Feb. 20, 1996

[54] SYSTEM FOR GROUNDING SHIELDED CABLES

[75] Inventors: Günther Klein, Hamburg; Ulrich Loske, Gärtringen, both of Germany

[73] Assignee: Günther Klein, Industriebedarf GmbH, Ahrensburg, Germany

[21] Appl. No.: 127,646

[22] Filed: Sep. 28, 1993

[30]     Foreign Application Priority Data

Sep. 29, 1992 [DE] Germany ............... 42 32 571.4
Feb. 19, 1993 [DE] Germany ............... 43 05 071.9

[51] Int. Cl.⁶ .................................................. H02G 3/04
[52] U.S. Cl. ................................ 174/48; 174/151
[58] Field of Search ................ 174/48, 151, 152 R, 174/156, 157; 248/68.1

[56]                References Cited

U.S. PATENT DOCUMENTS 4,677,253  6/1987  Blomqvist ........................ 174/35 R
4,702,444  10/1987 Beele ................................... 248/56
4,901,956  2/1990  Jacobsen ............................. 248/56
4,919,372  4/1990  Twist et al. ......................... 248/56

Primary Examiner—Laura Thomas
Attorney, Agent, or Firm—Collard & Roe

[57]                   ABSTRACT

A device and a system for electrically coupling a cable with shielding to an electrical ground as it passes through a bulkhead. The device includes an elastic, electrically conducting metal pad securely coupled to a section of the cable shielding within the bulkhead. An electrically conductive connection terminal is connected to the pad. A contact spring for connecting the connection terminal to the electrical ground is provided, wherein the cable shielding is grounded as it passes through the bulkhead. The pad, the connection terminal and the contact spring are supported within a molded bulkhead module. Multiple bulkhead modules are packed into a clamping frame with the contact springs being electrically coupled to a grounded contact bar.

16 Claims, 7 Drawing Sheets

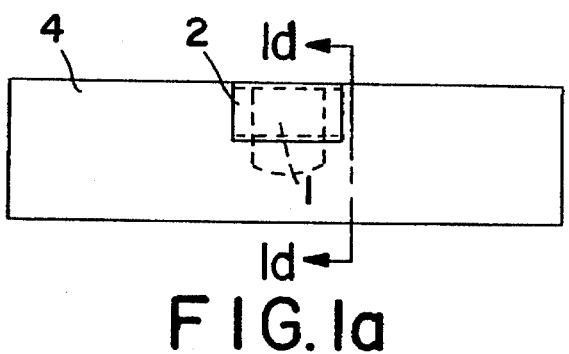
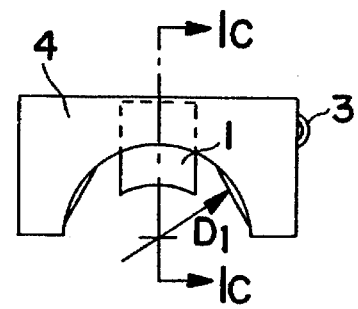
FIG.1a    FIG.1b
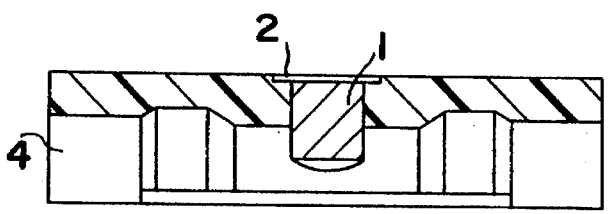
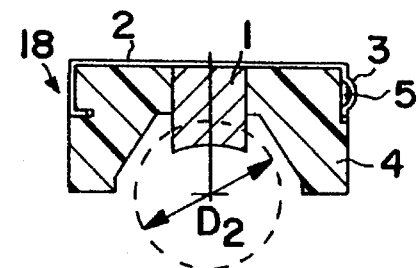
FIG.1c    FIG.1d
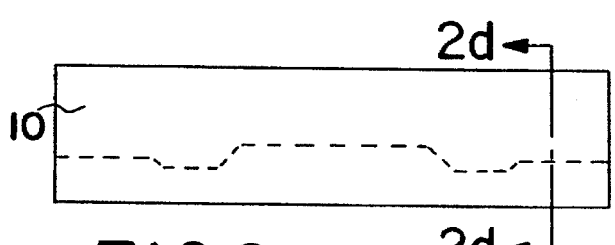
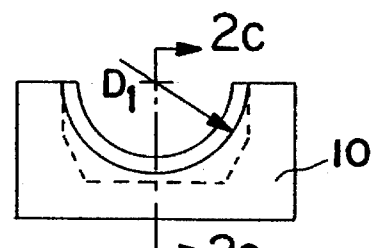
FIG.2a    FIG.2b
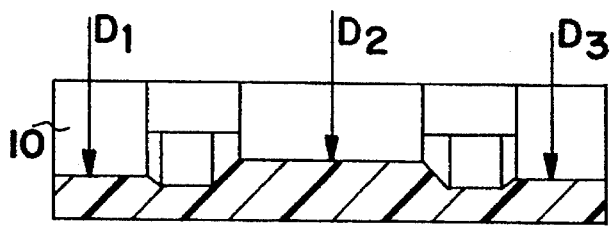
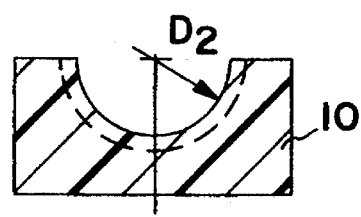
FIG.2c    FIG.2d

SYSTEM FOR GROUNDING SHIELDED CABLES

BACKGROUND OF THE INVENTION

1. Field of the Invention

The present invention relates to a device and a system for grounding shielded cables as they pass through bulkheads or shielded walls.

2. The Prior Art

For electrical shielding and/or safety reasons, it is known to run cables through shield walls and bulkheads, for example on ships, in power plants, computer centers, etc. These systems consist of several bulkhead modules within the bulkheads or shield walls. The area on either side of the bulkhead are separated from each other. The bulkhead provides a seal against water and gas, and also operates as a fire wall.

Electrical signal cables or coaxial cables have one or more shields for protecting the central conductor from electric, magnetic and/or electromagnetic fields. If the cables pass through bulkheads or shield walls, they must be grounded. Accordingly, systems have been designed where the cable shielding is grounded as it passes through the bulkhead or shield wall. With the known systems, the cable is sealed to the two outer sides of the bulkhead. Within the bulkhead, the outer cable insulation and any other inner insulation, if present, are removed over a length of several centimeters, so that the cable shields are exposed. A silver casting mass based on a synthetic resin casting compound having a high concentration of silver particles is poured into the interior of the bulkhead. Following curing of the silver casting mass, a workable contact between the cable shield and a potential-free ground is achieved.

However, these prior art systems have numerous drawbacks including the unfavorable electrical conductivity of silver casting masses as compared to the conductivity of pure metal. The casting mass principle is very costly because of the high percent of silver used, among other reasons. Furthermore, in many applications, particularly ship-building with highly limited space conditions, filling the systems with the silver casting mass presents problems. Another serious drawback is that silver casting masses may become brittle over time. Vibration and changing thermal stresses may cause the silver mass to tear, so that the functional safety of the system is compromised over time. Furthermore, a chemical incompatibility may exist between the synthetic resin casting compound and the shield or insulation of the cable. This may lead to the deterioration of the cable with high consequential damages. This problem is particularly significant if the cable and the silver casting mass of different manufacturers are not chemically compatible with each other.

SUMMARY OF THE INVENTION

It is therefore an object of the present invention to overcome the drawbacks of the prior art and to provide a device for grounding shielded cables as they pass through shielded equipment walls, shield spaces and bulkheads.

It is a further object of the present invention to provide a device that assures electrical contact with the cable shield while maintaining conventional cable fixing and shielding functions.

It is yet another object of the present invention to provide a system for grounding shielded cables wherein various sizes and numbers of cables can be grounded.

It is a further object of the system to provide a complete HF shield across the entire surface area of the bulkhead except where the signal carrying conductors pass therethrough.

These and other related objects are achieved according to the invention by bulkhead modules, which are elements for securing cables in passages and for sealing such passages. The bulkhead modules are placed into a packing system and are each equipped with a metal pad which is particularly well suited for contacting cable shields, in such a way that a permanent contact with the cable shield is assured with simple installation. Electric interference currents are conducted off via a connection terminal fitted with a contact spring. The metal pad itself assures a permanent and safely functioning contacting even with high dynamic loading of the system due to vibrations of the cables or vibrations introduced via the bulkheads or shield walls. Contact takes place without cutting open the cable shield, which is embodied in the form of a mesh, and without heating the cable, as occurs with soldered connections.

The good metallic conductivity of the metal pads, which are manufactured from individual, highly stressable wires, can be enhanced further by using certain copper alloys and/or by a galvanic surface coating of the individual wires, for example, with tin, silver or gold. By a suitable galvanic surface coating it is possible at the same time to achieve an excellent and durable protection of the metal pad against corrosion and aging as well as aggressive environmental conditions.

The shape of the metal pad is adapted or configured to the cylindrical shape of the cable. For example, the metal pad can be designed in such a way that contact over 360° of the circumference of the cable is possible.

The flexibility of the metal pad can be varied through various geometric shapes and also by the wire material used, the diameter of the individual wires, and the packing density. Thus, depending on the type of cable and the cable diameter, an exactly defined spring action of the metal pad is present via the shield at a predetermined contact pressure in order to compensate for certain dimensional tolerances of the cable and to assure contact in spite of such dimensional variations.

The elastic properties of the metal pad remain unchanged even across a high temperature range. For example, temperature ranges from −90° to +400° can be tolerated with the metal pad.

The connection of the metal pad with the connection terminal is preferably made through a central contact, i.e., a soldered connection. An annular metal pad can be connected to the connection terminal also from the inside via a spot weld. Thus, there is always a low-resistance discharge of the electric interference currents.

The molded body surrounding the metal pad can be manufactured, for example, from a thermoplastic material by injection molding. Thus, an economical and accurately sized product is manufactured. A halogen-free and fire-resistant thermoplastic is used to assure a high degree of functional safety in the event of fire. This is particularly important because for contacting the cable shield, the outer insulating layer and possibly additional inner insulating layers have been removed. Even in the event of fire, this particularly vulnerable region of the cable can be protected over a reasonable period of time by the halogen-free and fire-resistant material properties of the module.

The outer dimensions of the bulkhead modules are selected in such a way that several module units can be assembled as a packing system in a clamping frame preferably made of steel. Different module dimensions for different cable dimensions are adapted to each other in such a way that a compact construction is possible. The individual bulkhead modules have a good electrical connection among each other via the contact spring, which is incorporated in the connection terminal, so that it is possible in this way for electrical shield currents to be directly leaked off into the metallic clamping frame or into a contact bar arranged in the clamping frame.

Furthermore, the invention is intended to provide a complete packing system consisting of a clamping frame casing, cable-supporting modules, filling modules, anchoring disks, intermediate plates, as well as an end sealing unit. The system has the same enhanced shielding properties for electrical currents to a ground potential. Moreover, with the packing system, the bulkhead is completely sealed against high-frequency electro-magnetic interferences, except for where the signal carrying conductors pass through.

According to another feature of the invention, the end seal consists of a plastic body divided in the middle, with a metal pad mounted between the halves of the plastic body and joined with the latter, for example, by gluing. The metal pad projects beyond the modules disposed thereunder. A metal plate with a highly flexible HF end seal surrounding the plate is supported on the metal pad opposite the clamping screw of the packing system.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 1a shows a left side elevational view of a top half of a bulkhead module;

FIG. 1b shows a front side elevational view of a top half of a bulkhead module;

FIG. 1c is a cross-sectional view of a top half of the bulkhead module, taken along lines 1c—1c of FIG. 1b;

FIG. 1d is a cross-sectional view of the top half of the bulkhead module, taken along lines 1d—1d of FIG. 1a;

FIG. 2a is a left side elevational view of a bottom half of a bulkhead module;

FIG. 2b is a front side elevational view of a bottom half of a bulkhead module;

FIG. 2c is a cross-sectional view of the bottom half of the bulkhead module, taken along lines 2c—2c of FIG. 2b;

FIG. 2d is a cross-sectional view of the bottom half of a bulkhead module, taken along lines 2d—2d of FIG. 2a;

DETAILED DESCRIPTION OF PREFERRED EMBODIMENTS

Figure 3:
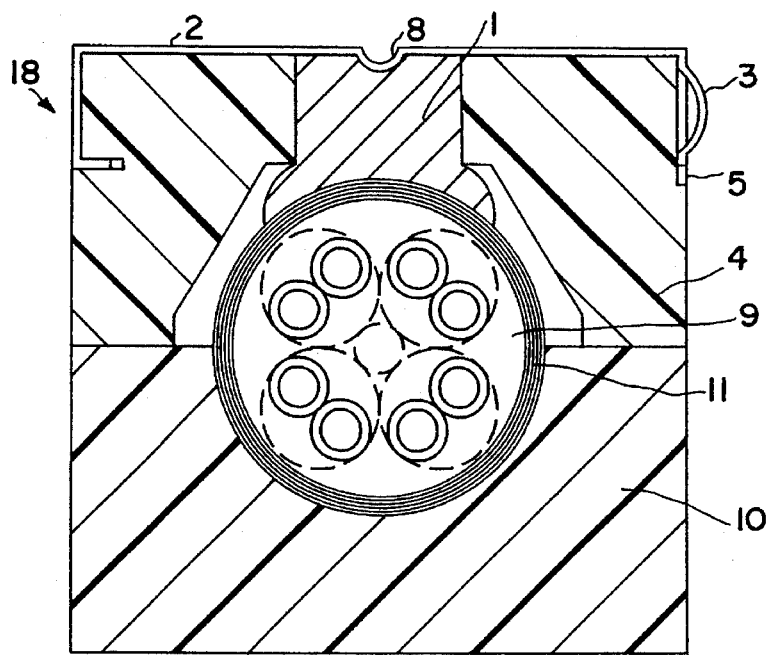
FIG. 3 is a cross-sectional view of the top and bottom halves of the bulkhead module with a cable clamped therebetween with partial shield contact.

Referring now in detail to the drawings and, in particular, to FIGS. 1a through 1d and 3, there is shown a metal pad 1 disposed in the center of the top half of a bulkhead module, and a connection terminal 2. A contact spring 3 is laterally incorporated on one end of connection terminal 2. The top half of the bulkhead module is designed as a molded body 4 having a recess 5 for connection terminal 2 and contact spring 3. Recess 5 conforms to the dimensions of connection terminal 2 in such a way that molded body 4 and connection terminal 2 fit precisely together.

As can be seen in FIG. 3, molded body 4 is provided with an extended recess 5 which, when the bulkhead module is laterally pressed against an adjacent bulkhead module or a contact bar 7 (see FIG. 5) within clamping frame 6, contact spring 3 is flattened into recess 5. A central contact 8 for connecting metal pad 1 to connection terminal 2 is shown in FIG. 3 as a soldered site.

FIG. 3 shows cable 9, which includes four pairs of central conductors, supported in the bulkhead module. The outside diameter of cable 9 is denoted by $D_1$. With the outer layer of insulation removed, cable 9 has an outside diameter of $D_2$, which corresponds to the diameter of cable shield 11. FIGS. 1a through 1d and 2a through 2d show the spacing for the inlet and outlet openings of top molded body 4 and bottom molded body 10. With only partial shield contact as shown in FIG. 3, bottom molded body 10, opposite metal pad 1 set within the top molded body 4, has spacing $D_2$. Thus, cable 9 is exactly positioned with respect to metal pad 1 and is not deformed when contact pressure is applied via metal pad 1.

Figure 4:
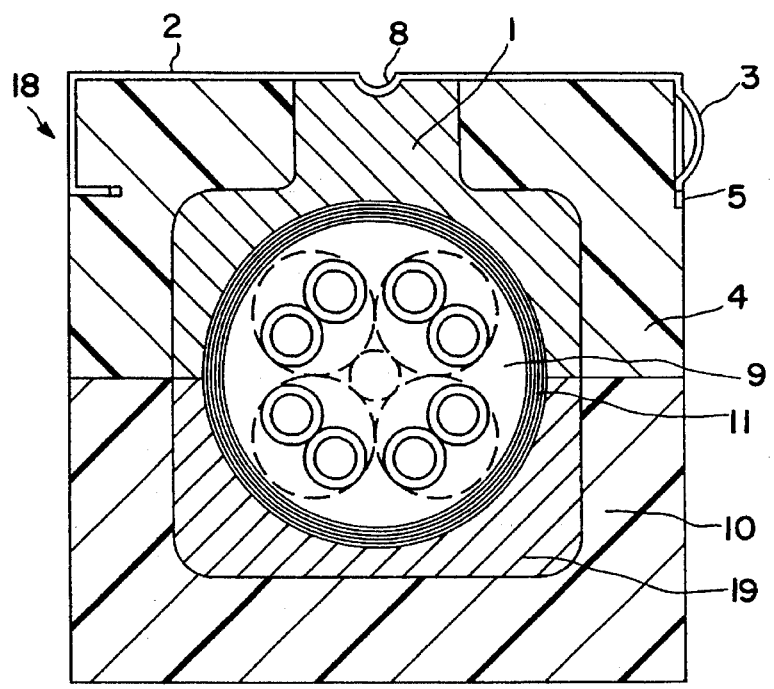
FIG. 4 is a cross-sectional view of the top and bottom halves of the bulkhead module with a cable clamped therebetween with complete shield contact.

FIG. 4 shows an alternate embodiment with complete 360° shield contact. Contact is achieved by shaping metal pad 1 in top half 4 of the bulkhead module and metal pad 19 in bottom half 10 of the bulkhead module. Bottom half 10 is provided with a trough shown in dotted line in FIG. 2b to accommodate pad 19. By applying contact pressure to the two halves of the bulkhead module, metal pads 1 and 19, contact of the metal pads with one another is assured.

Figure 5:
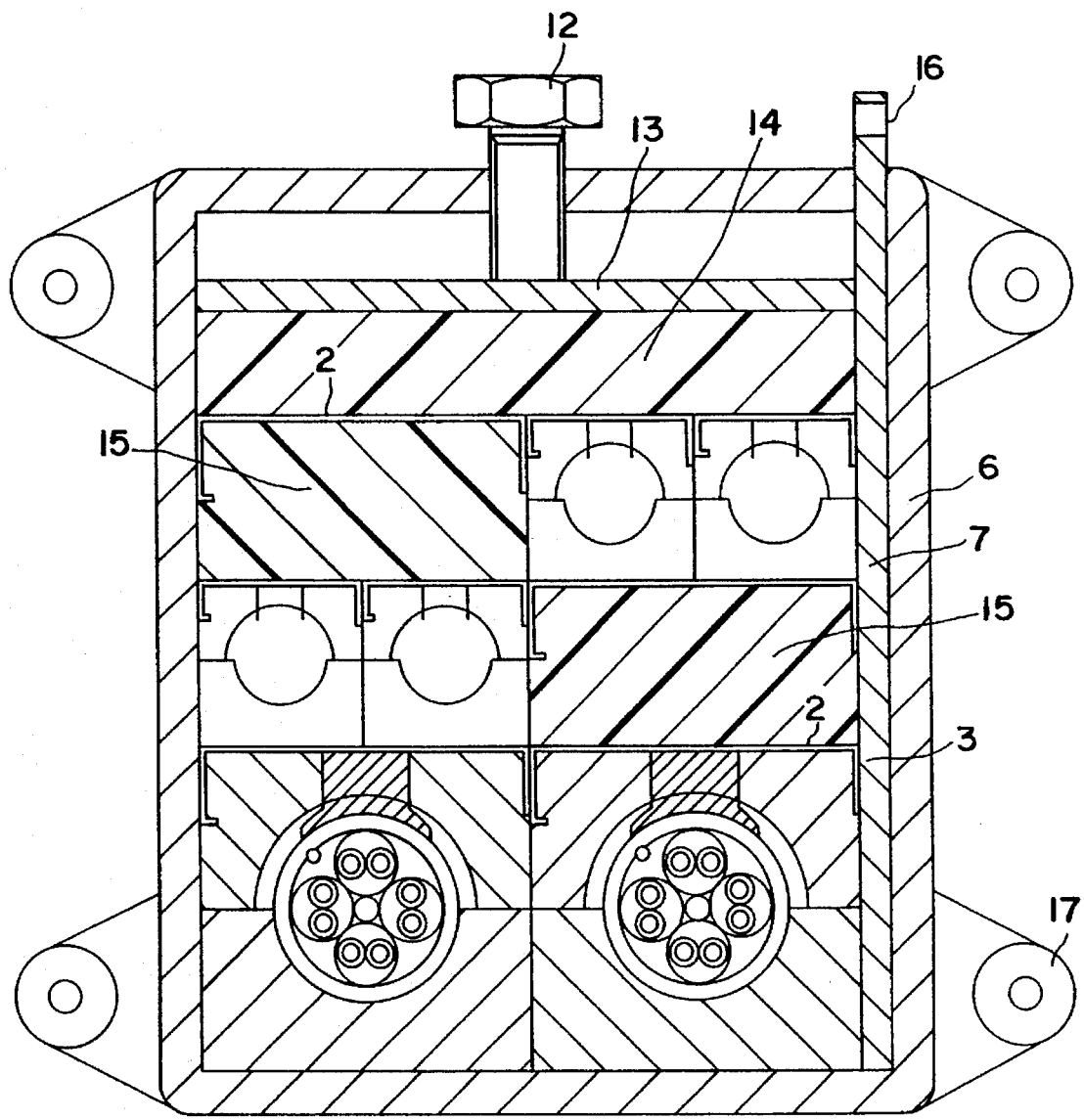
FIG. 5 is a cross-sectional view of a packing system with several bulkhead modules.

The system shown in FIG. 5 includes several bulkhead modules of different sizes. The two bottom bulkhead modules are combined and pressed together by contact pressure screw 12 via an end sealing unit. The end sealing unit is subdivided into a torsion resistant steel plate 13 and a permanently elastic plastic block 14. Plastic block 14 preferably consists of the same halogen-free and fire-resistant thermoplastic as the two molded bodies 4 and 10. Contact springs 3 of the left column of modules contact surfaces 18 of the right column of modules.

If the system is not fully filled with cables, filling modules 15 are inserted in the empty places. Filling modules 15, too, are provided with a connection terminal 2, in which a contact spring 3 is incorporated. It is assured in this way that the discharge of the shield currents to the contact bar 7 can take place also via the filling modules 15 irrespective of the position of the bulkhead module in the system. Contact bar 7 is provided with a passage bore 16 where it exits from the clamping frame 6. A connection to a potential-free grounding contact can always be made with contact bar 7 and bore 16 even if the clamping frame is anchored, for example, onto a brick wall via fastening points 17.

Figure 6:
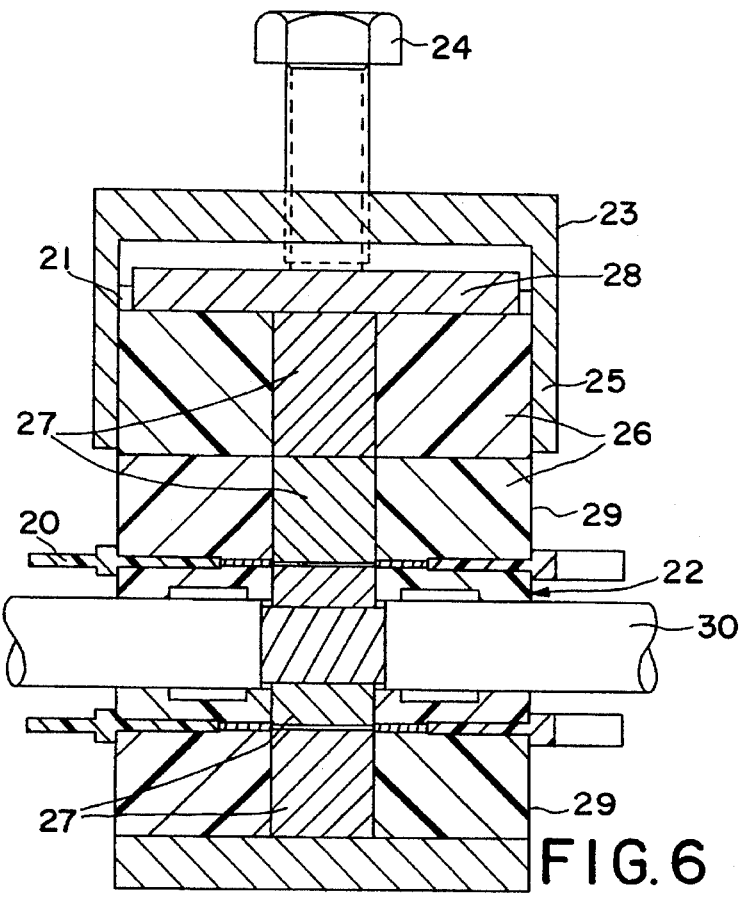
FIG. 6 is a cross-sectional view of an alternate embodiment of a packing system according to the invention.

FIG. 6 shows the system with a clamping frame case 23 with a clamping screw 24 for the end seals 25, which is assembled from plastic bodies 26 with a metal pad 27, a steel plate 28, and an HF end seal 21. Modules 22 for receiving the cables 30 and filling modules 29, which are fixed in place by anchoring disks 20, are arranged in clamping frame case 23. With the arrangement shown, the entire breakthrough site in the bulkhead is sealed against high-frequency radiation by the contact of metal pads 27. The system also provides a barrier to fire, vapor, liquid, etc.

Figure 7:
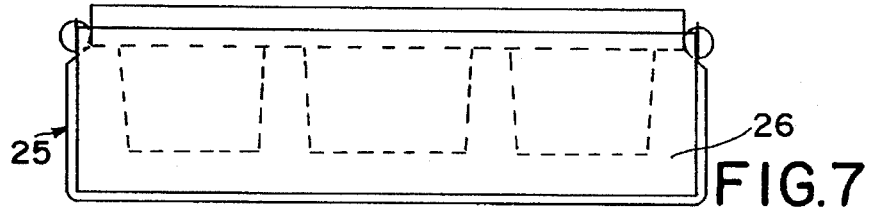
FIG. 7 is a left side elevational view of a plastic body of an end seal.
Figure 8:
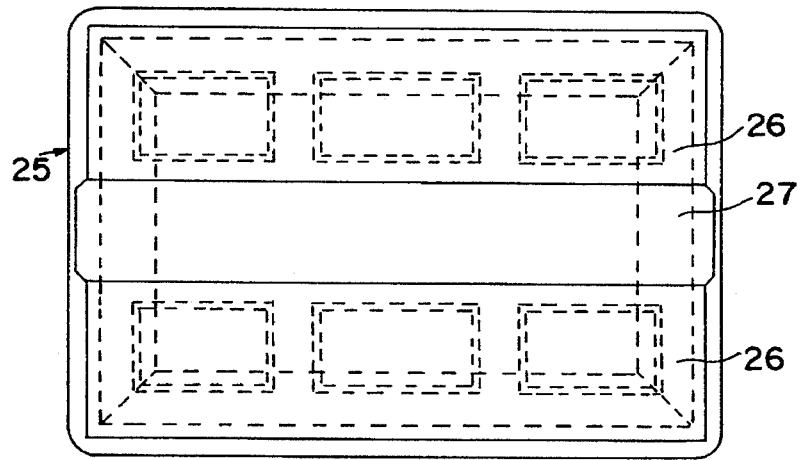
FIG. 8 is a top plan view of the plastic body of the end seal with a metal pad.
Figure 9:
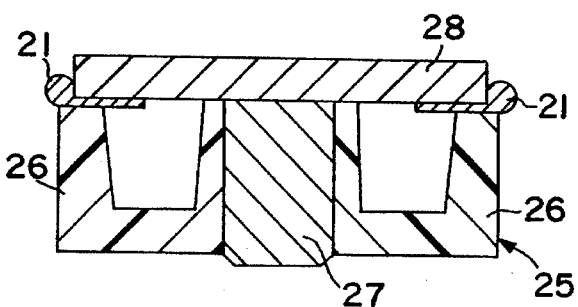
FIG. 9 is a cross-sectional view of the end seal.
Figure 10:
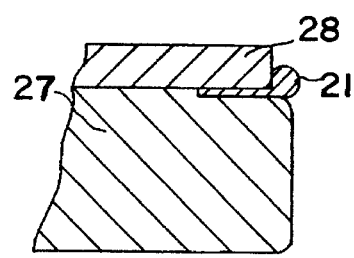
FIG. 10 is another cross-sectional view of the end seal.
Figure 11:
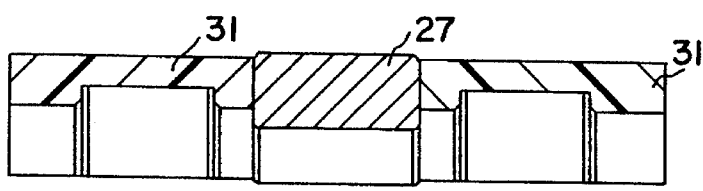
FIG. 11 is a cross-sectional view of the top half of a cable-supporting module.
Figure 12:
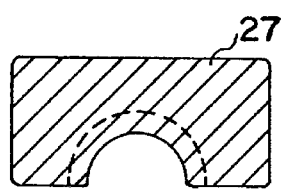
FIG. 12 is a cross-sectional view through the metal pad of the module of FIG. 11.
Figure 13:
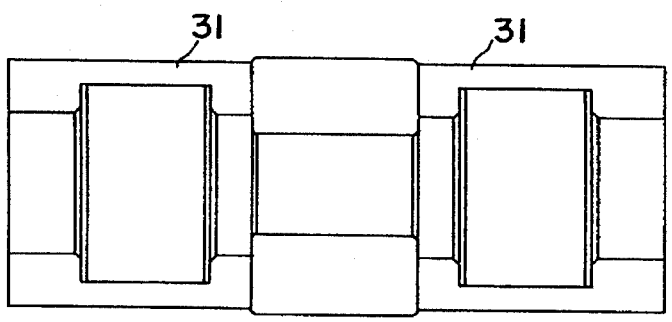
FIG. 13 is a top plan view of the bottom half of the module.

Of the individual elements of the packing system, FIGS. 7 to 9 show the end seal 25, which includes a plastic body 26, which is divided in the middle, and a metal pad 27 disposed between the halves of plastic body 25 and joined with the latter, by gluing. It can be seen that metal pad 27 overlaps about 2 mm of the modules disposed underneath. FIGS. 9 and 10 show that a highly flexible HF seal 21 is mounted beneath contact pressure plate 28. It is assured in this way that an HF-tightness is present across the entire clamping frame in all three axes. FIGS. 11 to 13 show the top part of a module for receiving the cable. The bottom part of the module would be shaped correspondingly. In the half of the module shown, the metal pad 27 is embodied in such a way that in the relieved condition, the core bore amounts to, for example, 12 mm. When installing a cable with an outside diameter of, for example, 17 mm, the metal pad is sufficiently pressed via the mesh of the cable with a diameter of about 15 mm across the mesh.

Figure 14:
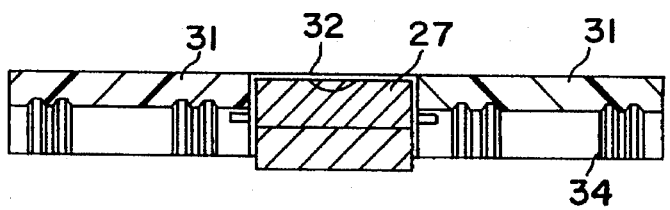
FIG. 14 is a cross-sectional view of the top half of another embodiment of a module.
Figure 15:
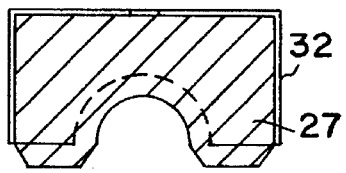
FIG. 15 is a cross-sectional view through the metal pad of the module of FIG. 14.
Figure 16:
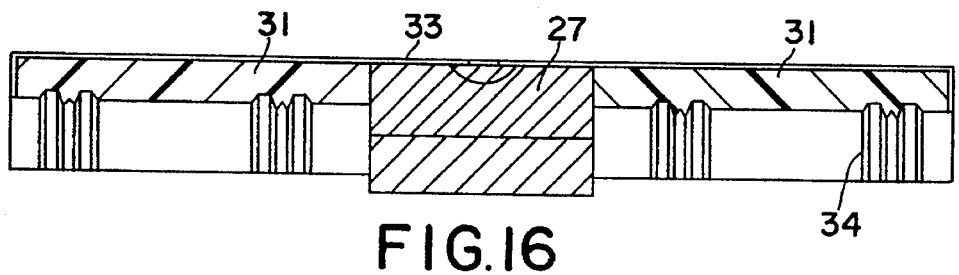
FIG. 16 is a cross-sectional view of the top half of another embodiment of the module.
Figure 17:
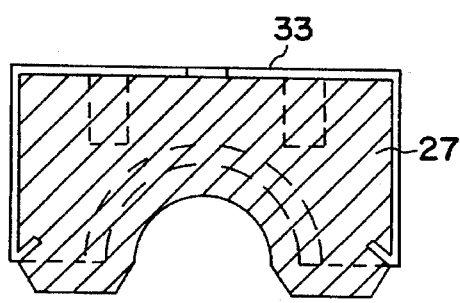
FIG. 17 is a cross-sectional view through the metal pad of the module of FIG. 16.
Figure 18:
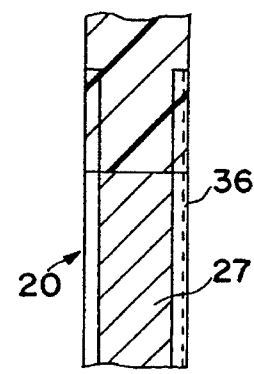
FIG. 18 is a partial top plan view of an anchoring disk.

FIGS. 14 to 17 show variations of modules for receiving cables, in particular, for smaller module dimensions in case the strength of the glued sites between the plastic bodies and the metal pad is inadequate. In FIGS. 14 and 15, metal pad 27 is mounted in a cage 32 and, as can be seen in the FIGS., plastic bodies 31 are produced on said cage by injection molding. In FIGS. 16 and 17, cage 33 totally covers the plastic bodies 31 and metal pad 27. The sealing grooves 34 for the cable are shown in these FIGS. as well.

Figure 19:
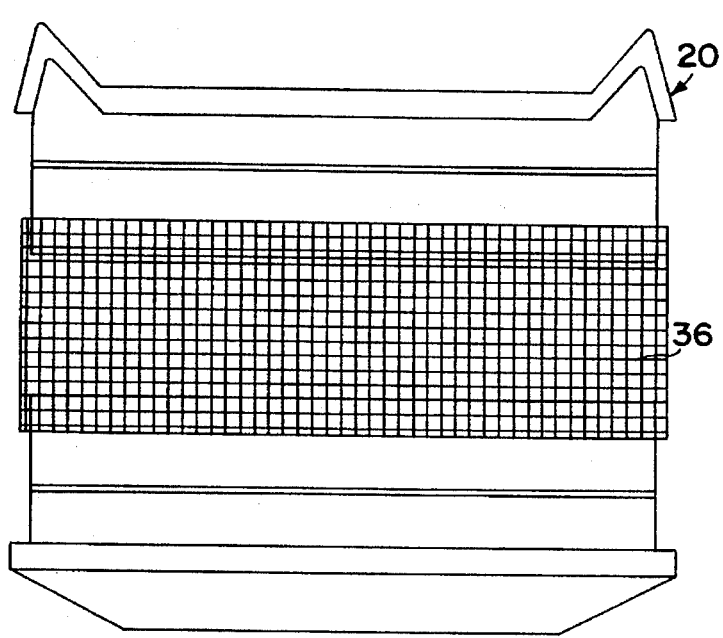
FIG. 19 is a front side elevational view of the anchoring disk.
Figure 20:
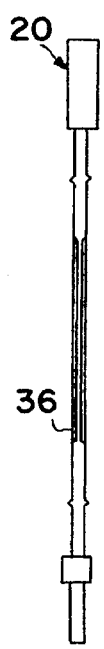
FIG. 20 is a back side elevational view of the anchoring disk.
Figure 21:
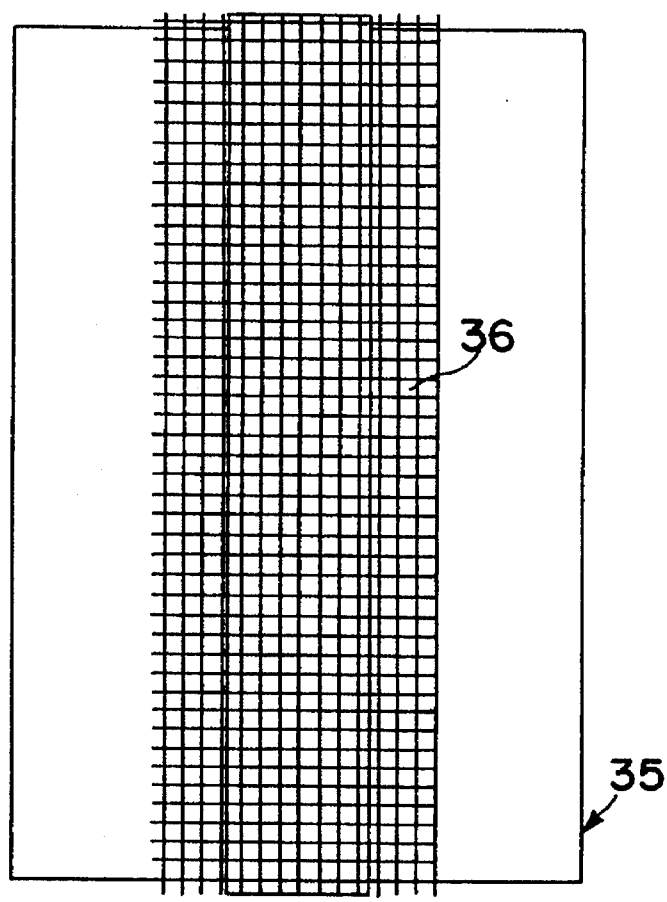
FIG. 21 is a front side elevational view of an intermediate plate.
Figure 22:
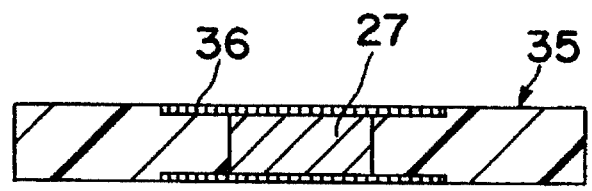
FIG. 22 is an enlarged cross-sectional view of the intermediate plate from FIG. 21.

FIGS. 19 and 20 show an anchoring disk 20 for the modules in clamping frame 6. Anchoring disks 20 are divided in the middle and the parts are connected to each other with a metal pad. The fastening of the plastic halves with the metal pad is achieved by pressing a finely meshed metal fabric 36 into the two plastic halves. FIGS. 21 and 22 show intermediate plate 35 with finely meshed metal fabric 36 and a metal pad 27.

While only several embodiments of the present invention has been shown and described, it is to be understood that many changes and modifications may be made thereunto without departing from the spirit and scope of the invention as defined in the appended claims.

What is claimed is:

1. A device for electrically coupling a cable with shielding to an electrical ground as it passes through a bulkhead, the device comprising:

an elastic, electrically conducting metal pad securely coupled to a section of the cable shielding within the bulkhead;

an electrically conductive connection terminal connected to said pad;

a contact spring for connecting said connection terminal to the electrical ground, wherein the cable shielding is grounded as it passes through the bulkhead.

2. A device for electrically coupling a cable as claimed in claim 1, wherein said pad is made from a copper alloy having enhanced electrical conductivity characteristics.

3. A device for electrically coupling a cable as claimed in claim 1, wherein said pad, said connection terminal and said contact spring are coated with a highly conductive metal coating selected from a group consisting of tin, silver and gold.

4. A device for electrically coupling a cable as claimed in claim 1, wherein said pad is configured to the cylindrical shape of the shielded cable.

5. A device for electrically coupling a cable as claimed in claim 1, further comprising:

a bulkhead module including two molded bodies for supporting said pad, said connection terminal and said contact spring; said molded bodies are made by an injection-molded halogen-free, fire-resistant thermoplastic.

6. A device for electrically coupling a cable as claimed in claim 5, additionally comprising:

a metal clamping frame with a contact bar, wherein a plurality of bulkhead modules are packed into said clamping frame, each of said bulkhead modules has a corresponding contact spring that is connected to a selected one of said contact bar and said connection terminal of an adjacent bulkhead module.

7. A device for electrically coupling a cable as claimed in claim 6, further comprising:

a plurality of anchoring disks each including an intermediate plate; and an end sealing unit;

wherein each bulkhead module is adapted for a specified cable size and said plurality of bulkhead modules are packed into said clamping frame with said anchoring disks and retained therein by said end sealing unit.

8. A device for electrically coupling a cable as claimed in claim 7, wherein said end sealing unit comprises:

a plastic body divided into two halves and a metal end pad glued between said plastic body halves, said metal end pad including a projection for placement against one of said bulkhead modules;

a clamping screw; and a steel plate with a highly flexible HF end sealing unit, said HF end sealing unit extending entirely around said steel plate;

wherein said clamping screw forces said steel plate against said plurality of bulkhead modules, said HF end sealing unit being disposed on a side of said steel plate opposite said clamping screw.

9. A device for electrically coupling a cable as claimed in claim 8, wherein said HF end sealing unit comprises:

an O-ring sealing disposed between said clamping frame and said steel plate; and a flat fastening part integrally formed with said O-ring and disposed between said steel plate and said plastic body and glued to said plastic body.

10. A device for electrically coupling a cable as claimed in claim 9, wherein each of said bulkhead modules comprises:

a top molded body;

a bottom molded body formed as a mirror-image of said top part, said bottom molded body is spaced from said top molded body and encloses a cable therebetween;

each of said top and bottom molded bodies having two halves with said pad glued between said halves, said pad extends beyond the periphery of each of said top and bottom molded bodies.

11. A device for electrically coupling a cable as claimed in claim 10, wherein said metal end pads are arranged within said clamping frame with said steel plate and said HF end sealing unit to cooperatively shield against HF interference across the entire surface of the bulkhead except where the cables pass through the bulkhead.

12. A device for electrically coupling a cable as claimed in claim 10, additionally comprising:

a metal cage, wherein said metal pad is arranged in said metal cage and said plastic bodies are injection molded onto said metal cage.

13. A device for electrically coupling a cable as claimed in claim 10, wherein said metal pad and said plastic bodies are mounted together in a common metal cage.

14. A device for electrically coupling a cable as claimed in claim 13, wherein said plastic bodies include sealing lips on a side facing the cable.

15. A device for electrically coupling a cable as claimed in claim 14, wherein said anchoring disks and said intermediate plates are formed from separate parts between which said metal pad is mounted, said metal pad is connected to said plastic disk and plate parts by finely meshed metal fabric layers pressed into said parts.

16. A device for electrically coupling a cable with shielding to an electric ground without disturbances as it passes through bulkheads and screen walls, the device comprising:

an elastic, electrically conducting metal pad permanently and uninterruptably connecting the cable shielding to the electric ground;

an electrically-conductive connection terminal connected to said pad; and a contact spring for additionally connecting said electrically-conductive connection terminal to the electric ground.

* * * * *